United States Patent [19]
Ueda

[11] Patent Number: 6,105,462
[45] Date of Patent: Aug. 22, 2000

[54] BICYCLE PEDAL

[75] Inventor: Yutaka Ueda, Tondabayashi, Japan

[73] Assignee: Shimano Inc., Osaka, Japan

[21] Appl. No.: 09/258,901

[22] Filed: Mar. 1, 1999

[51] Int. Cl.$^7$ .................................................. B62M 3/08
[52] U.S. Cl. ........................................................ 74/594.6
[58] Field of Search .............................. 74/594.6, 594.1; 36/131, 132

[56]  References Cited

U.S. PATENT DOCUMENTS

| | | | |
|---|---|---|---|
| 4,686,867 | 8/1987 | Bernard et al. | 74/594.6 |
| 4,762,019 | 8/1988 | Beyl | 74/594.6 |
| 4,827,797 | 5/1989 | Le Faou et al. | 74/594.6 |
| 5,003,841 | 4/1991 | Nagano | 74/594.4 |
| 5,142,938 | 9/1992 | Sampson | 74/594.6 |
| 5,195,397 | 3/1993 | Nagano | 74/594.4 |
| 5,203,229 | 4/1993 | Chen | 74/594.6 |
| 5,423,233 | 6/1995 | Peyre et al. | 74/594.6 |
| 5,497,680 | 3/1996 | Nagano | 74/594.6 |
| 5,505,111 | 4/1996 | Nagano | 74/594.6 |
| 5,557,985 | 9/1996 | Nagano | 74/594.6 |
| 5,755,144 | 5/1998 | Ueda | 74/594.6 |
| 5,778,739 | 7/1998 | Takahama | 74/594.6 |
| 5,787,764 | 8/1998 | Peyre | 74/594.6 |
| 5,802,930 | 9/1998 | Chen | 74/594.6 |
| 5,868,043 | 2/1999 | Ueda | 74/594.6 |
| 6,012,356 | 1/2000 | Ueda | 74/594.6 |

*Primary Examiner*—Charles A Marmor
*Assistant Examiner*—Ha Ho
*Attorney, Agent, or Firm*—Shinjyu Global IP Counselors, LLP

[57] ABSTRACT

A bicycle pedal assembly is provided for attaching a shoe thereto via a cleat. The bicycle pedal has a pedal body rotatably coupled to the second end of the pedal shaft for supporting a cyclist's foot. The pedal body preferably has a pair clamping members pivotally coupled thereto. Each of the clamping members has a front cleat engagement portion and a rear cleat engagement portion for engaging the cleat. A biasing member is coupled between the pedal body and each of the clamping members. The front cleat engagement portion of each of the clamping members is designed to hold to cleat above the upper support surface of the pedal body. The rear cleat engagement portion of each clamping member is designed to pivot rearwardly upon a twisting movement between the cleat and the pedal body. The rear cleat engagement portion of each clamping member has a central portion and two side portions. The side portions have cleat guide surfaces that engage complimentary cleat guide surfaces of the cleat. The central portion has a curved stop surface that engages a central projection formed on the rear end of the cleat.

20 Claims, 8 Drawing Sheets

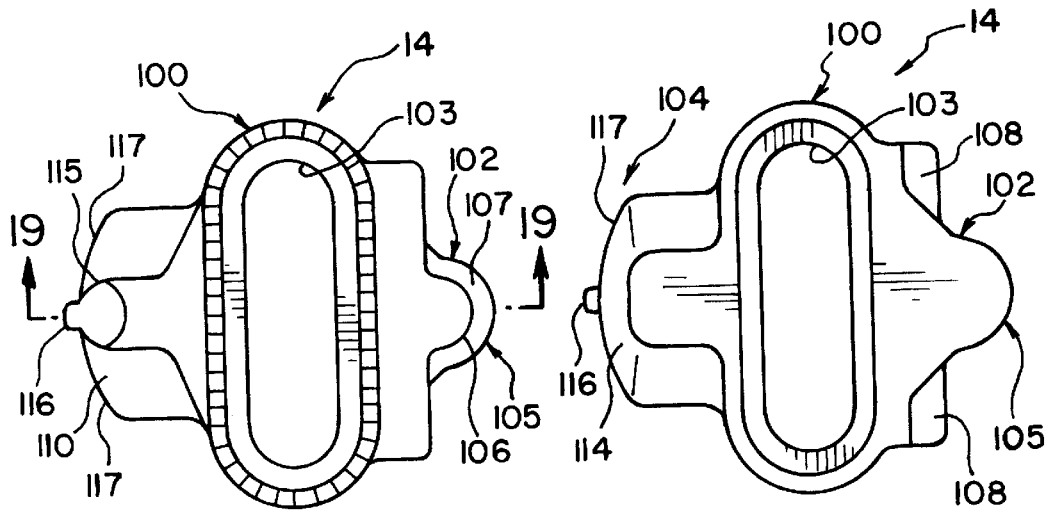
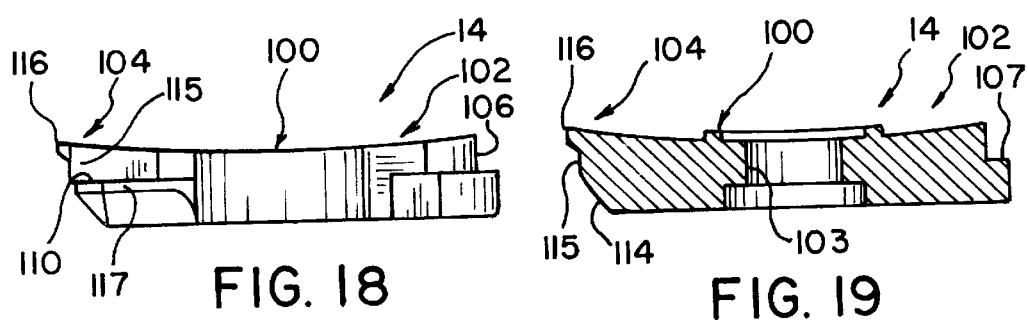
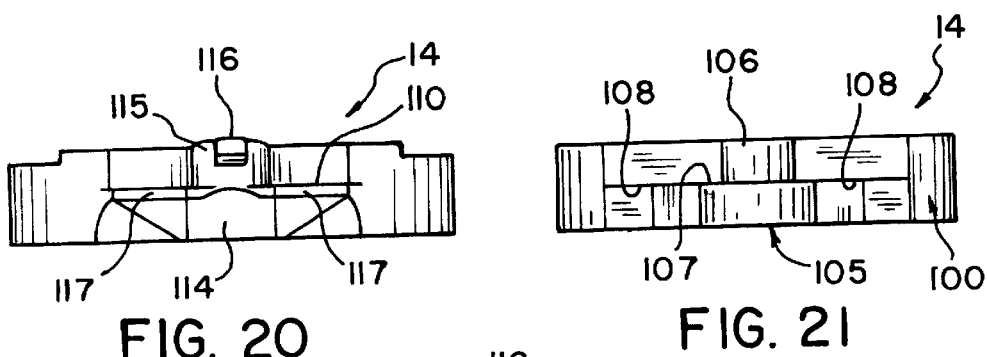
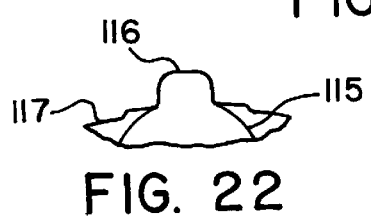
FIG. 16  FIG. 17  FIG. 18  FIG. 19  FIG. 20  FIG. 21  FIG. 22

BICYCLE PEDAL

BACKGROUND OF THE INVENTION

1. Field of the Invention

This invention generally relates to a bicycle pedal. More specifically, the present invention relates to a clipless or step-in bicycle pedal with pivotally mounted clamping members.

2. Background Information

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal the cleat engagement mechanism front and rear cleat clamping members that are fixed on both sides of the pedal body for engaging front and rear portions of a cleat. Road racing pedals typically only has a cleat engagement mechanism on one side of the pedal body. In either case, in this type of bicycle pedal, the rider steps onto the pedal and the cleat engagement mechanism automatically grips on to the cleat secured to the bottom of the cyclist's shoe.

More specifically, when attaching the cyclist's shoe to the step-in pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

When step-in pedals are used for road type bikes, the pedal is typically only provided with a single clamping assembly such that the cyclist's shoe can only be coupled to one of the two sides of the pedal. Off road or mountain type bikes, on the other hand, usually have a pair of clamping assemblies such that the cyclist's shoe can be clamped to either side of the pedal. In either case, it is desirable to design the pedal to be as compact and lightweight as possible.

One problem with most clipless pedals is that they are quite small such that only small portions of the pedal body engage the rider's shoe. Specifically, the pedal body has a tread surface located on both sides of the cleat engagement mechanism. This tread surface has only a small surface area because the pedal body is typically made as small as possible so that it will be lightweight. With this type of clipless pedal, the shoe and the pedal are in a state of constant engagement when the cleat clamping is engaged in the cleat clamping members, so the pedaling force can be transmitted efficiently to the pedals. As a result, clipless pedals are widely employed on racing bicycles used in road racing and mountain bike racing.

With this type of clipless pedal, if the shoe and the pedal are loose to the right and left around the cleat clamping members, then the rider's foot will wobble to the right and left and the rider's pedaling force will not be transmitted efficiently to the pedal. Therefore, any looseness to the right and left between the shoe and pedal should be suppressed to a minimum by having the rubber portion of the shoe sole come into contact on the right and left of the cleat with a tread surface provided to the pedal body.

The conventional structure described above merely consists of bringing the rubber portion of the shoe sole into contact with a tread surface having a tiny surface area in order to suppress looseness to the right and left of the shoe. Therefore, the contact length is minimal, and it is difficult to suppress properly the looseness to the right and left. Moreover, since the portion of the shoe sole that is in contact with the tread surface is the same portion that comes into contact with the ground when the rider is walking, it tends to wear down, and when this portion of the sole wears down, the tread surface and the shoe sole no longer come into contact uniformly, making it difficult to suppress the looseness between the shoe and pedal.

Downhill races, dual slalom races, cross-country races, and other such off-road races for mountain bikes and BMX (bicycle motocross) have been widely staged in recent years. In this type of off-road race, unlike in road racing, the riders traverse an unpaved track. Furthermore, with this type of off-road racing the foot must be repeatedly taken off the pedal during cornering and replaced on the pedal after the corner has been exited. Unfortunately, since the racing is performed on unpaved roads, mud clings to the pedals and tends to clog the cleat clamping members. Once the cleat clamping members become clogged with mud, the cleat cannot be engaged in the cleat clamping members, and the shoe cannot be attached to the pedal. Moreover, the mud often clogs the biasing mechanism such that the clamping members may not operate properly.

In view of the above, there exists a need for a bicycle pedal which overcomes the above mentioned problems in the prior art. In view of the above, it is apparent that there exists a need for a clipless bicycle pedal which limits or prevents dirt, mud, or the like from contaminating the adjustment mechanism. This invention addresses these needs in the art, along with other needs, which will become apparent to those skilled in the art once given this disclosure.

SUMMARY OF THE INVENTION

One object of the present invention is to provide a bicycle pedal, which works well in dirty and muddy environments.

Another object of the present invention is to provide a bicycle pedal that supports the cleat above the pedal body.

Another object of the present invention is to provide a bicycle pedal and cleat with an improved releasing action between the bicycle pedal and cleat.

Another object of the present invention is to provide a bicycle pedal that is relatively lightweight.

Another object of the present invention is to provide a bicycle pedal that is relatively inexpensive to manufacture.

The foregoing objects can basically be attained by providing a bicycle pedal assembly for attaching a shoe thereto via a cleat. The bicycle pedal assembly includes a pedal shaft, a pedal body, a first clamping member, a first biasing member and a second clamping member. The pedal shaft has a first end for attachment to a bicycle crank and a second for supporting a cyclist's foot. The pedal body is rotatably coupled to the second end of the pedal shaft. The pedal body has a first end and a second end. The first clamping member is pivotally coupled to the first end of the pedal body. The first clamping member has a center portion with a first cleat engagement surface facing in a first direction and a pair of side portions with cleat guide surfaces located on opposite sides of the center portion. The cleat guide surfaces are angled to aid guide of the cleat upon a relative twisting movement occurring between the cleat and the pedal body. The first biasing member is coupled between the pedal body and the first clamping member. The second clamping member is coupled to the second end of the pedal body. The second clamping member has a second cleat engagement surface facing in the first direction and a third cleat engagement surface facing in a second direction which is substantially opposite to the first direction.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 16 is a top plan view of the cleat, which cooperates with the bicycle pedal illustrated in FIGS. 1–7;

FIG. 17 is a bottom plan view of the cleat illustrated in FIG. 16 for use with the bicycle pedal illustrated in FIGS. 1–7;

FIG. 18 is a side elevational view of the cleat illustrated in FIGS. 16 and 17 for use with the bicycle pedal illustrated in FIGS. 1–7;

FIG. 19 is a cross-sectional view of the cleat illustrated in FIGS. 16–18 for use with the bicycle pedal illustrated in FIGS. 1–7 as seen along section line 19—19 of FIG. 16;

FIG. 20 is a right end elevational view of the cleat illustrated in FIGS. 16–19 for use with the bicycle pedal illustrated in FIGS. 1–7;

FIG. 21 is a left end elevational view of the cleat illustrated in FIGS. 16–20 for use with the bicycle pedal illustrated in FIGS. 1–7;

FIG. 22 is an enlarged, partial top plan view of the rear engaging portion of the cleat illustrated in FIGS. 16–21;

DETAILED DESCRIPTION OF THE PREFERRED EMBODIMENTS

Figure 1:
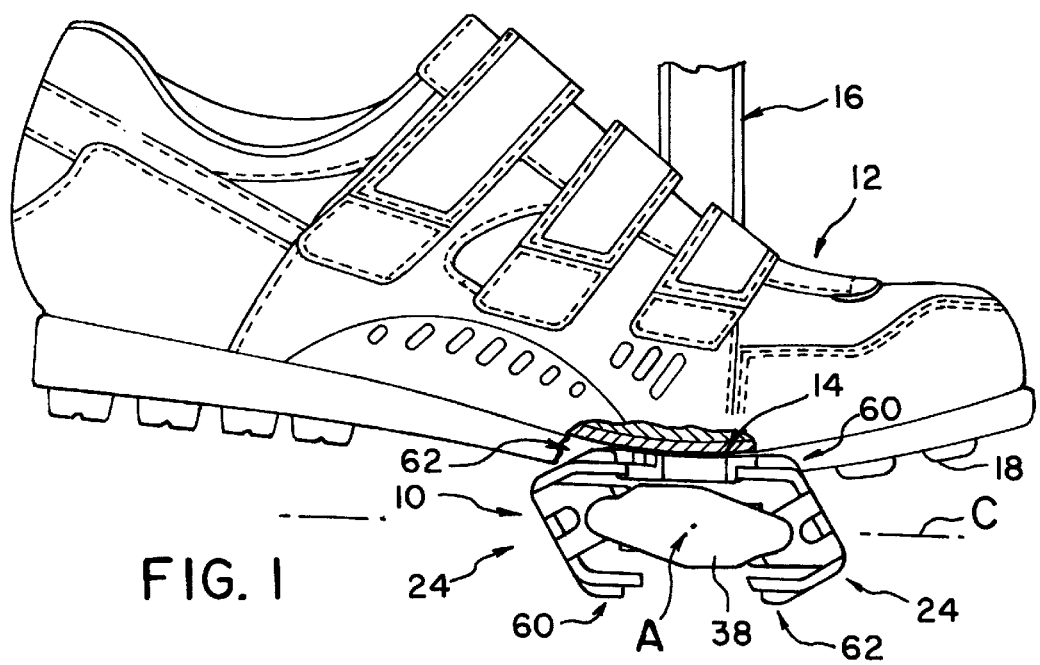
FIG. 1 is an outside elevational view of a bicycle shoe attached to a right bicycle clipless pedal coupled to a cleat of a bicycle shoe in accordance with a first embodiment of the present invention.

Referring initially to FIGS. 1 through 7, a bicycle pedal 10 is illustrated in accordance with the first embodiment of the present invention. Bicycle pedal 10 is a clipless or step-in pedal that can be used with a bicycle shoe 12 with a cleat 14 coupled thereto. Bicycle pedal 10 is especially designed for use with off-road bicycles as opposed to use with a road bicycle. Of course, bicycle pedal 10 can be used on a road bicycle or any type of bicycle if needed and/or desired. As seen in FIG. 1, bicycle pedal 10 is fixedly coupled to bicycle crank arm 16 of a bicycle for rotation therewith, while cleat 14 is fixedly coupled to the bottom of sole 18 of a shoe 12.

Bicycle pedal 10 illustrated in FIGS. 1 through 7 is a right side pedal. Of course, the same pedals are provided on the right and left sides of the bicycle, except that the left side pedal 10 is a mirror image of the right side pedal 10. Thus, it will be apparent to those skilled in the art that the description of the right pedal 10 also applies to a left pedal.

Figure 2:
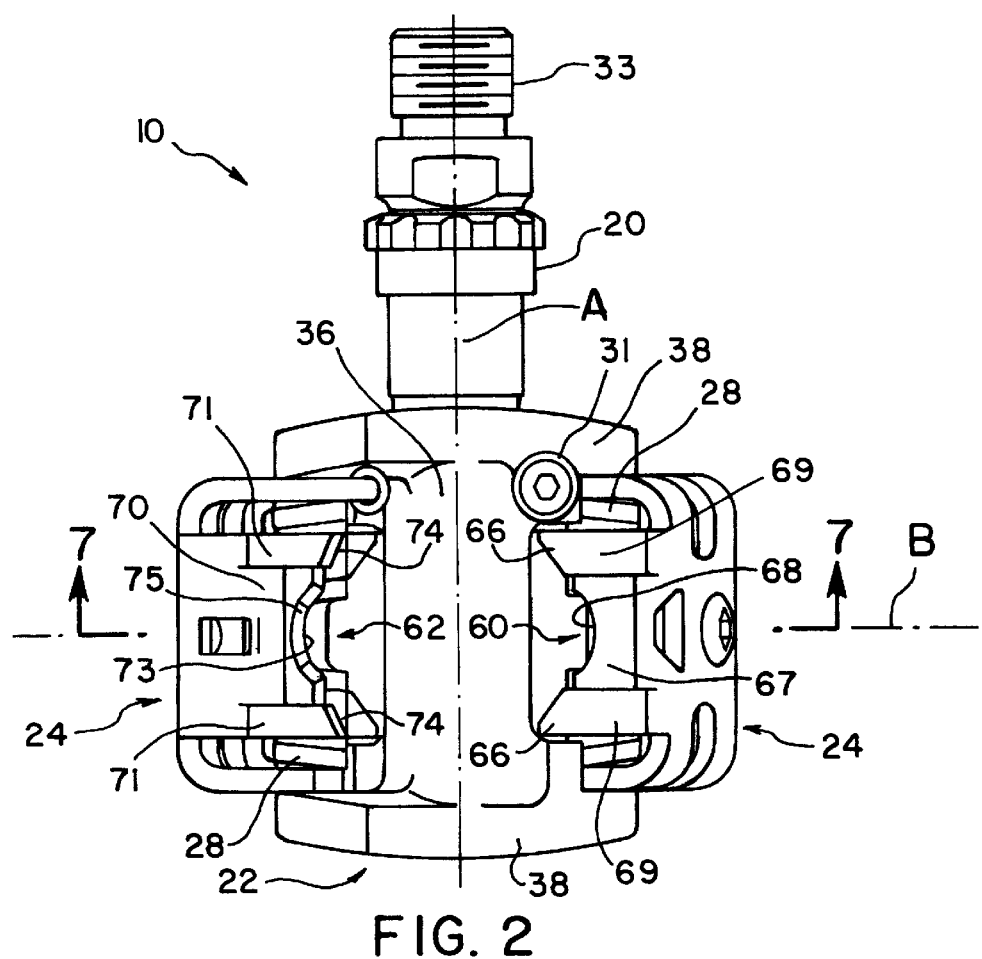
FIG. 2 is a top plan view of the right bicycle pedal illustrated in FIG. 1 in accordance with a first embodiment of the present invention.
Figure 3:
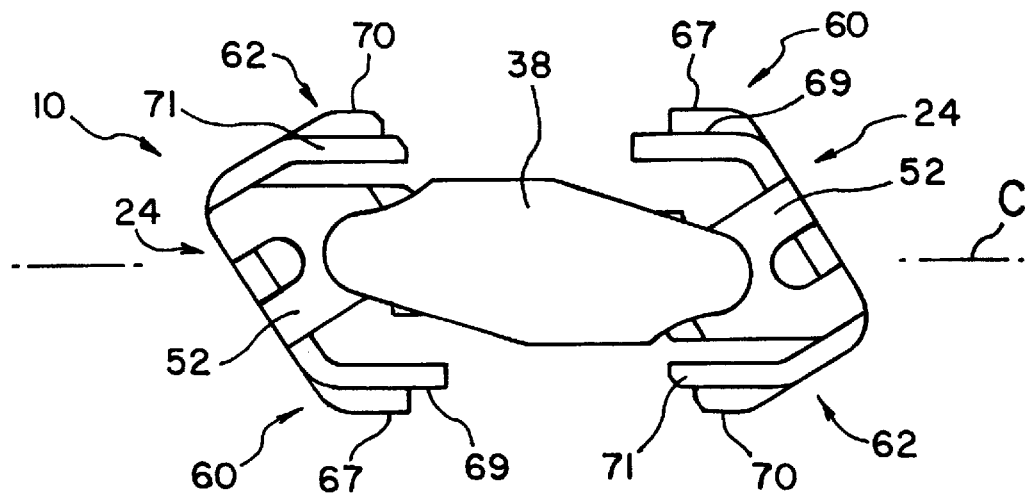
FIG. 3 is an outside elevational view of the right bicycle pedal illustrated in FIGS. 1 and 2 in accordance with a first embodiment of the present invention with a cleat partially coupled thereto.
Figure 4:
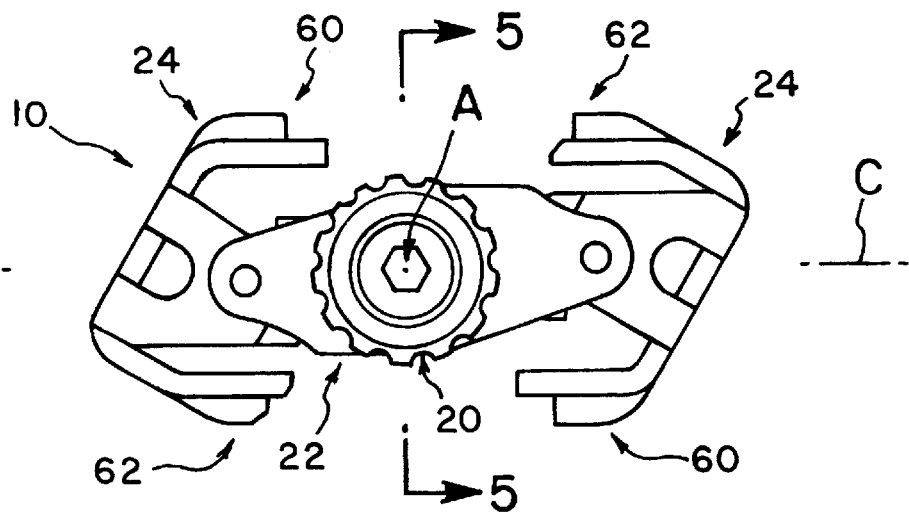
FIG. 4 is an inside elevational view of the right bicycle pedal illustrated in FIGS. 1–3 in accordance with a first embodiment of the present invention.
Figure 5:
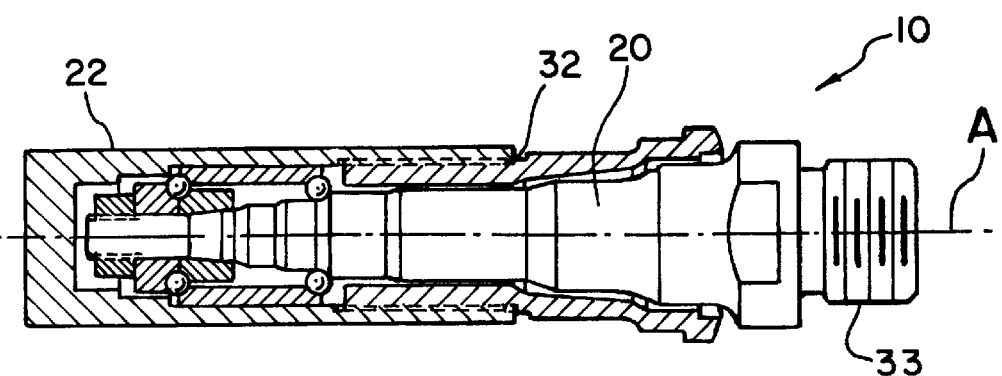
FIG. 5 is a longitudinal cross-sectional view of the bicycle pedal illustrated in FIGS. 1–4 as seen along section line 5—5 of FIG. 4.
Figure 6:
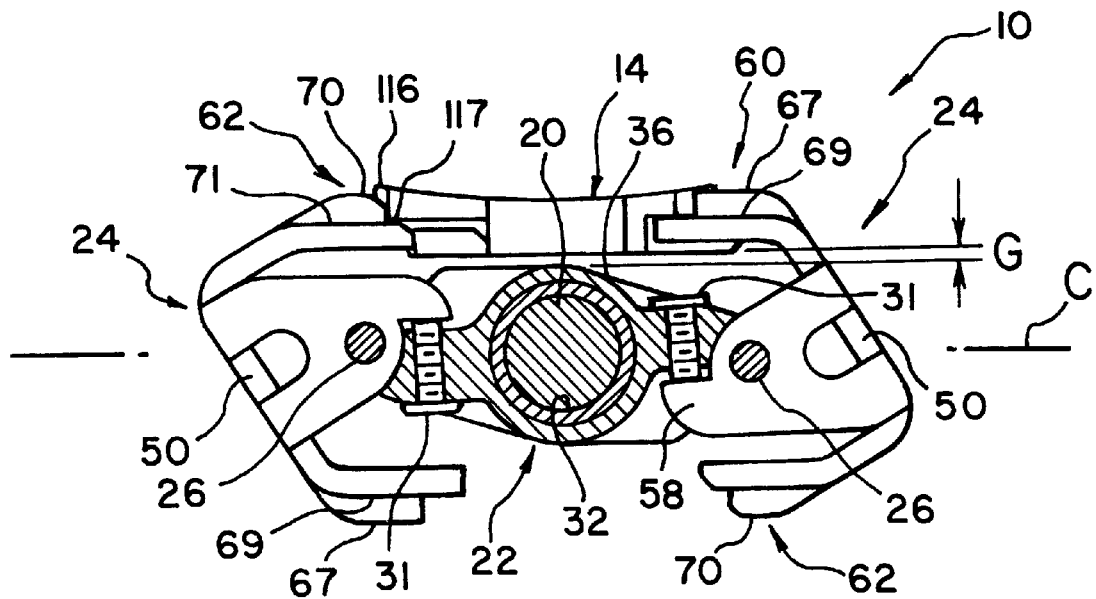
FIG. 6 is a first transverse cross-sectional view of the right bicycle pedal illustrated in FIGS. 1–5 as seen along section line 6—6 of FIG. 2, with a cleat shown in broken lines coupled thereto.

As seen in FIGS. 2 through 4, bicycle pedal 10 basically includes a pedal shaft or spindle 20 adapted to be coupled to crank arm 16 and a pedal body 22 rotatably coupled to spindle 20 for supporting a cyclist's foot. Pedal body 22 basically includes first and second clamping members 24. The first and second clamping members 24 are identical to each other such that each clamping member 24 forms a front cleat engagement portion and a rear cleat engagement portion, as discussed below. Each clamping member 24 is pivotally coupled to pedal body 22 by a pivot pin 26, a biasing members 28 and a pair of tension adjusting mechanism 30. In other words, each clamping member 24 has a front cleat engagement mechanism on one side of pedal body 22 and a rear cleat engagement mechanism on the opposite side of pedal body 22.

Pedal 10 in accordance with the illustrated embodiment is provided with an additional tension adjustment mechanism for biasing members 28. Pedal 10 has a pair of adjustment members or screws 31. Each adjustment member or screw 31 initially places one of the biasing members 28 under tension. Specifically, when clamping members 24, and biasing members 28 are coupled to pedal body 22 by pivot pins 26, biasing members 28 are normally not under tension. Adjustment member or screw 31 is threaded into a threaded hole 29 formed in the pedal body 22 such that the free end of the screw 31 contacts a portion of the associated clamping member 24 to rotate the clamping member 24. The associated biasing member 28 is now placed under tension. This arrangement allows for easy assembly of the bicycle pedal 10, since clamping members 24 and biasing members 28 can be coupled to pedal body 22 without placing biasing members 28 under tension. Also, this arrangement allows the initial tension to be regulated by utilizing thin washers between the head of the screws 31 and the pedal body 22.

Cleat 14 is designed to releasably couple sole 18 of shoe 12 to bicycle pedal by first and second clamping members 24. This type of pedal is often called a step-in or clipless pedal. Specifically, cleat 14 is engaged with pedal 10 by pressing cleat 14 into pedal 10 with a forward and downward motion. This releasably locks cleat 14 to pedal 10. Cleat 14 can be released from pedal 10 by twisting the heel of the shoe to the outside of pedal 10 as illustrated in FIGS. 23–26 and as discussed below in more detail.

As shown in FIG. 1, pedal spindle 20 is fastened to crank 16 of a bicycle, with pedal body 22 being rotatably coupled to pedal spindle 20 for supporting a rider's foot. Specifically, cleat 14 is fixedly attached to bicycle shoe 12, which in turn is releasably attached to pedal body 22 via one of the clamping members 24.

Pedal spindle 20 is a multi-step spindle having numerous stepped portions. Pedal spindle 20 is received in a stepped bore 32 (see FIG. 3) formed in pedal body 22. Pedal spindle 20 has a first end 33 with threads formed thereon for threadedly coupling pedal 10 to crank 16 in a conventional manner. The other end of pedal spindle 20 rotatably supports pedal body 22 in a conventional manner. Pedal body 22 can freely rotate about the center longitudinal axis A of pedal spindle 20. Since pedal spindle 20 is relatively conventional and its specific construction is not critical to the present invention, the construction of pedal spindle 20 will not be discussed in detail herein.

As shown in FIG. 2, pedal body 22 has a center tubular portion 36 for receiving pedal spindle 20 for rotation about center longitudinal axis A and a pair of side portions 38 for supporting clamping members 24. Pedal body 22 is preferably made of a lightweight material such as an aluminum alloy. One of the clamping members 24 is located at each end of pedal body 22. In particular, pedal body 22 is an H-shaped member (see FIG. 2). Pedal body 22 has a front or first end with one of the clamping member 24 pivotally coupled thereto via one of the pivot pins 26, and a rear or second end with rear clamping member 24 pivotally coupled thereto via the other pivot pin 26.

Side portions 38 extend in forward and rearward directions from center tubular portion 36. Clamping members 24 are located between side portions 38. Pivot holes 40 are formed at each end of side portions 38 for fixedly receiving pivot pins 26 to pivotally couple clamping members 24 thereto. The side portion 38 that is located on the inside of pedal body 22 has a part of tubular portion 36 extending outwardly therefrom.

As best seen in FIGS. 2 through 4, pedal body 22 is rotatably coupled to pedal shaft 20 for rotation about a center longitudinal axis A of pedal shaft 20. Pedal body 22 has a center longitudinal axis B extending between the front and the rear ends as seen in FIG. 2. Center longitudinal axis B of pedal body 22 extends substantially perpendicular to center longitudinal axis A of pedal shaft 20. A cleat receiving area is formed on each side of pedal body 22 for receiving and supporting cleat 14 thereon. More specifically, cleat receiving area is defined between clamping members 24.

Clamping members 24 selectively engage cleat 14 of bicycle shoe 12 to attach the sole of a bicycle shoe 12 to pedal 10. Clamping members 24 are pivotally coupled to the ends of the pedal body 22 by pivot pins 26. Clamping members 24 are curved in a roughly U-shaped configuration, with its two ends being swingably supported by pivot pins 26 (see FIGS. 6 and 7) that pass between side portions 38 of pedal body 22.

Figure 7:
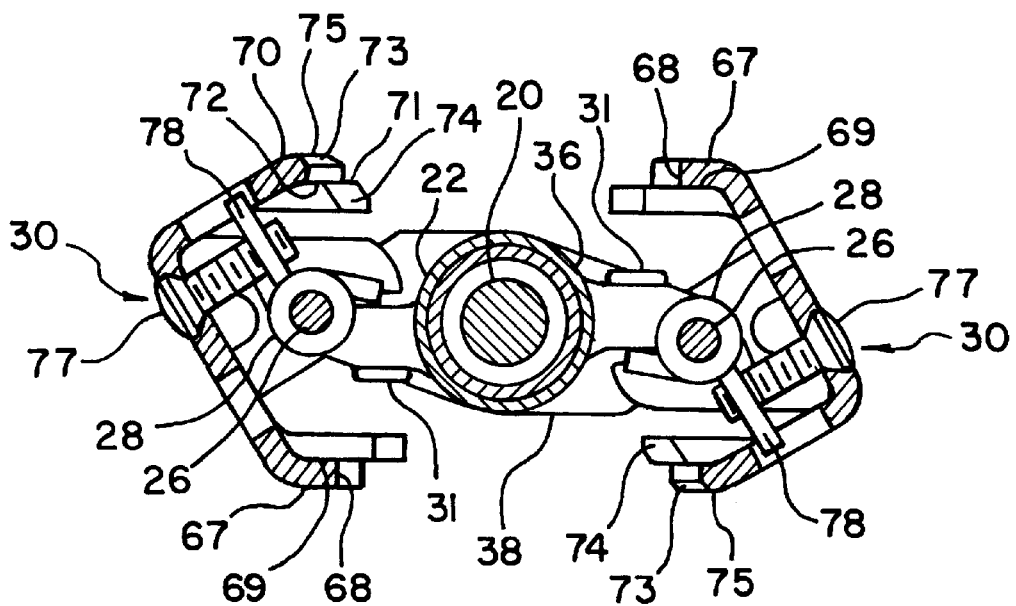
FIG. 7 is a second transverse cross-sectional view of the right bicycle pedal illustrated in FIGS. 1–6.

As best seen in FIGS. 2 and 7, each biasing member 28 is preferably formed by a pair of torsion springs. The torsion springs of biasing members 28 have their coiled portions mounted on pivot pins 26, with one end of each spring engaging a part of pedal body 22 and the other end of each spring engaging a part of tension adjusting mechanism 30 as mentioned below. Biasing members 28 normally urge clamping members 24 to rotate about their respective pivot pins 26 from their cleat releasing positions to their cleat engaging or clamping positions. In other words, biasing members 28 normally maintain clamping members 24 in cleat engaging positions. The retaining forces of biasing members 28 on clamping members 24 are controlled by tension adjusting mechanisms 30.

Referring now to FIGS. 8–15, each of the clamping members 24 includes a connecting portion 50 with a pair of legs 52 extending outwardly from connecting portion 50 for coupling clamping member 24 to pedal body 22 via pivot pins 26. More specifically, each of the legs 52 of each clamping member 24 has a mounting hole 54 formed therein for receiving a bushing (not shown) which in turn rotatably receives pivot pin 26. Accordingly, each clamping member 24 is pivotally mounted about its respective pivot pin 26 for movement between a cleat clamping position and a cleat releasing position. Each of the legs 52 also has a stop portion or flange 58 which engages the end of screws 31 to limit rotational movement of clamping member 24 via biasing member 28.

Each of the clamping members 24 has a front cleat engagement portion 60 and a rear cleat engagement portion 62. Front cleat engagement portion 60 extends from one side of connecting portion 50, while rear cleat engagement portion 62 extends from the other side of connecting portion 50. Front cleat engagement portion 60 engages the front portion of cleat 14, while a rear cleat engagement portion 62 engages the rear portion of cleat 14. Each front cleat engagement portion 60 of each clamping member 24 has a first cleat engagement surface 64 facing in a first direction and a second cleat engagement surface 66 facing in a second direction which is substantially opposite to the first direction.

First cleat engagement surface 64 is formed by a raised center flange 67 having a curved stop surface 68 for engaging cleat 14 to limit longitudinal movement of cleat 14 relative to pedal body 22. Curved stop surface 68 extends substantially perpendicular to first cleat engagement surface 64. Second cleat engagement surface 66 is formed by a pair of side flanges or sections 69, which are located on opposite sides of the raised center flange 67. In other words, second cleat engagement surface 66 has two spaced apart sections with first cleat engagement surface 64 located between spaced apart sections formed by side flanges or sections 69 of second cleat engagement surface 66. Side flanges or sections 69 forming second cleat engagement surface 66 are located closer to tubular portion 36 of pedal body 22 than first cleat engagement surface 64. Accordingly, a gap is formed between tubular portion 36 of pedal body 22 and the bottom surface of cleat 14. Preferably, a minimum clearance of approximately 0.35 mm is created between the tubular member of pedal body 22 and the bottom surface of cleat 14. In other words, side flanges or sections 69 of second cleat engagement surface 66 are located closer to tubular portion 36 of pedal body 22 than first cleat engagement surface 64.

First and second cleat engagement surfaces 64 and 66 preferably lie in substantially the same plane, but face in opposite directions. More specifically, first cleat engagement surface 64 faces downward away from sole 18 of shoe 12, while second cleat engagement surface 66 faces upward toward sole 18 of shoe 12. Thus, first and second cleat engagement surfaces 64 and 66 hold cleat 14 about tubular portion 36 of pedal body 22.

Figure 8:
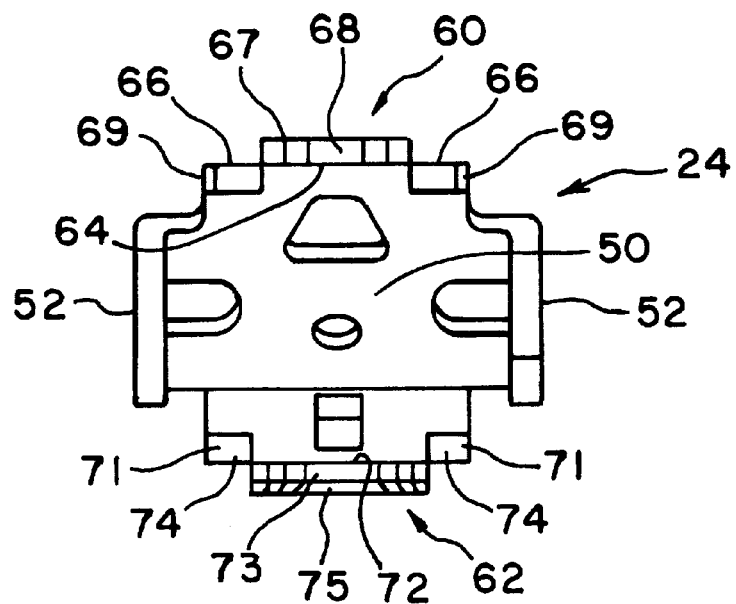
FIG. 8 is an inside end elevational view of one of the clamping members for the bicycle pedal illustrated in FIGS. 1–7 as viewed along the rear cleat engagement portion.
Figure 9:
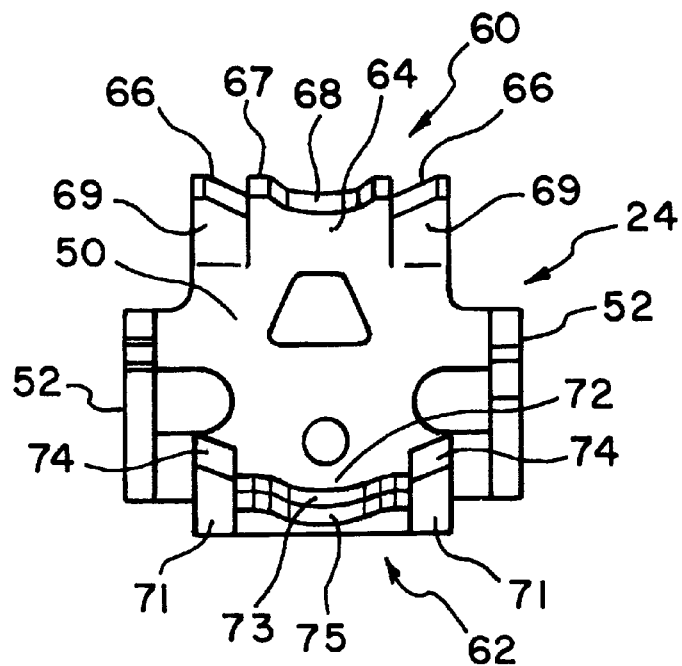
FIG. 9 is an inside end elevational view of the clamping member illustrated in FIG. 8 for the bicycle pedal illustrated in FIGS. 1–7 as viewed along the front cleat engagement portion.
Figure 10:
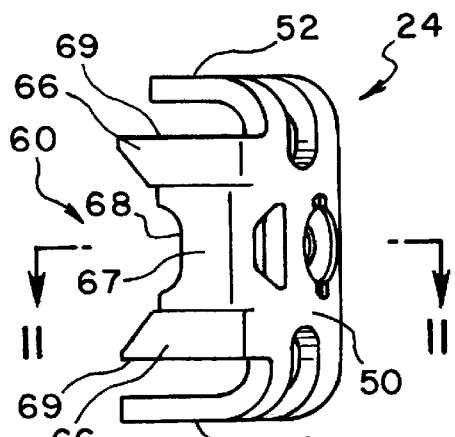
FIG. 10 is a top plan view of the clamping member illustrated in FIGS. 8 and 9 for the bicycle pedal illustrated in FIGS. 1–7.
Figure 11:
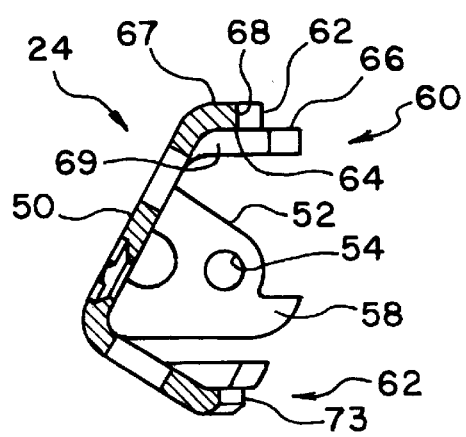
FIG. 11 is a cross-sectional view of the clamping member illustrated in FIGS. 8–10 for the bicycle pedal illustrated in FIGS. 1–7 as seen along section line 11—11 of FIG. 10.
Figure 12:
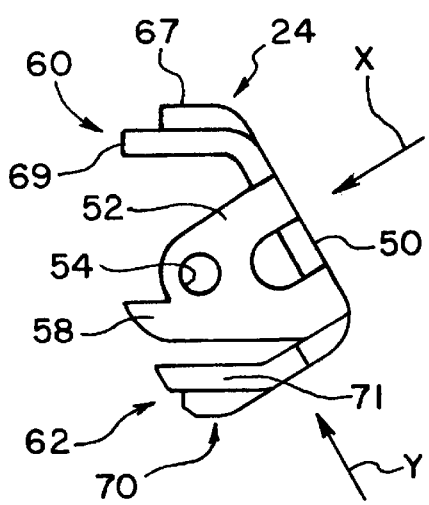
FIG. 12 is a side elevational view of the clamping member illustrated in FIGS. 8–11 for the bicycle pedal illustrated in FIGS. 1–5.
Figure 13:
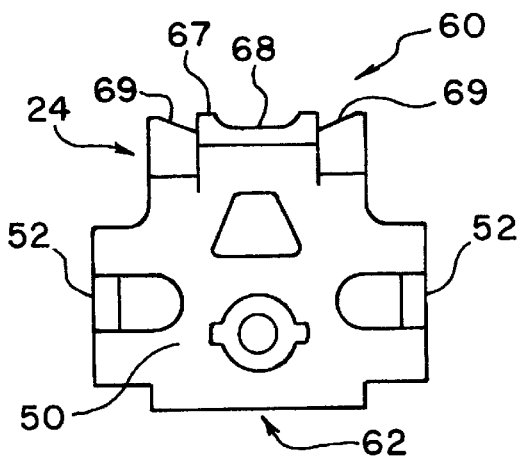
FIG. 13 is an outside oblique view of the clamping member illustrated in FIGS. 8–12 for the bicycle pedal illustrated in FIGS. 1–7 as viewed along arrow X of FIG. 12.
Figure 14:
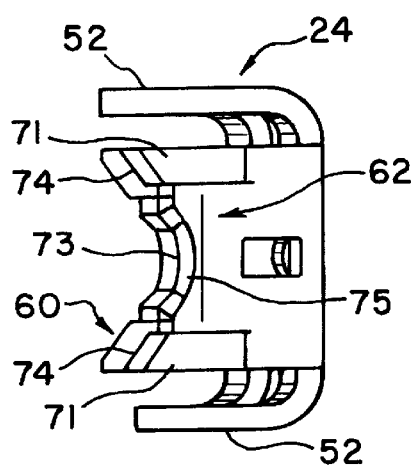
FIG. 14 is a bottom plan view of the clamping member illustrated in FIGS. 8–13 for the bicycle pedal illustrated in FIGS. 1–7.
Figure 15:
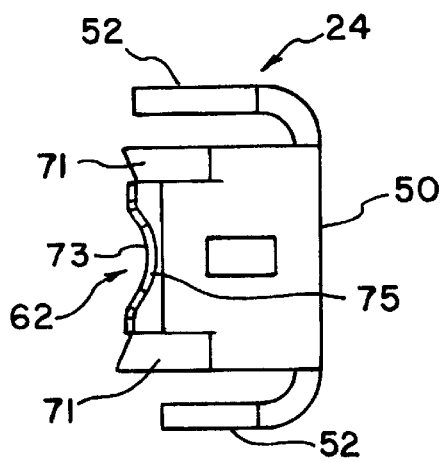
FIG. 15 is an oblique view of the clamping member illustrated in FIGS. 8–14 for the bicycle pedal illustrated in FIGS. 1–7 as viewed along arrow Y of FIG. 12.
Figure 23:
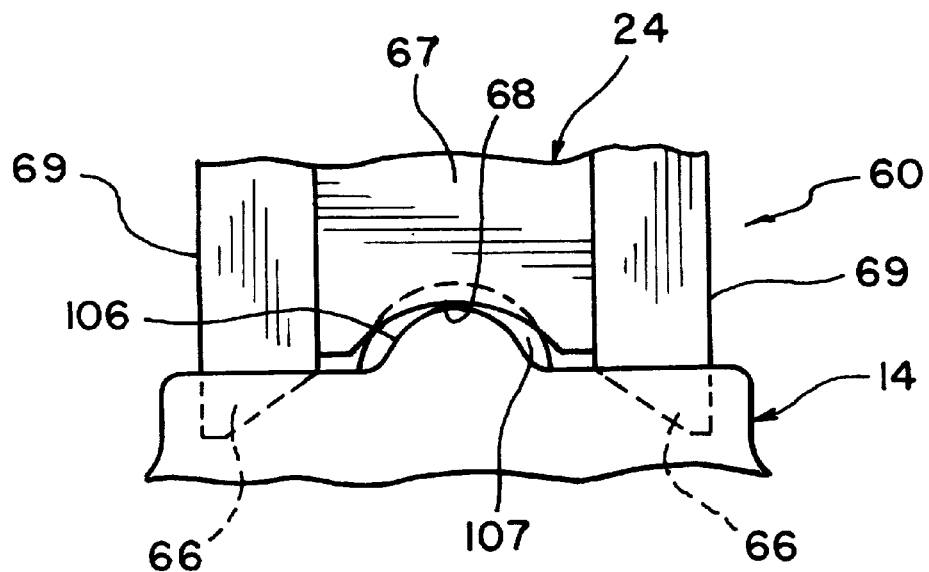
FIG. 23 is an enlarged, partial top plan view of the front engaging portion of the cleat engaging the front engagement portion of the clamping member for the bicycle pedal illustrated in FIGS. 1–7.
Figure 24:
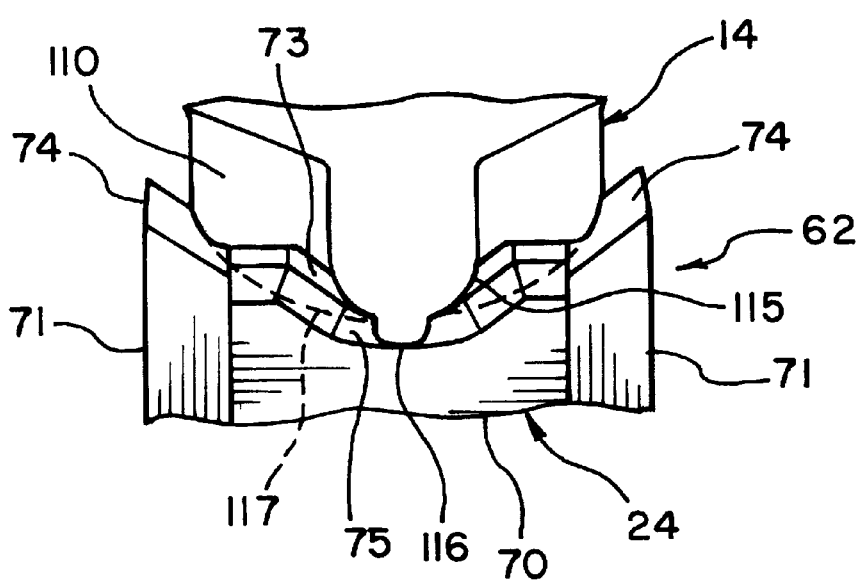
FIG. 24 is an enlarged, partial top plan view of the rear engaging portion of the cleat engaging the rear engagement portion of the clamping member for the bicycle pedal illustrated in FIGS. 1–7.
Figure 25:
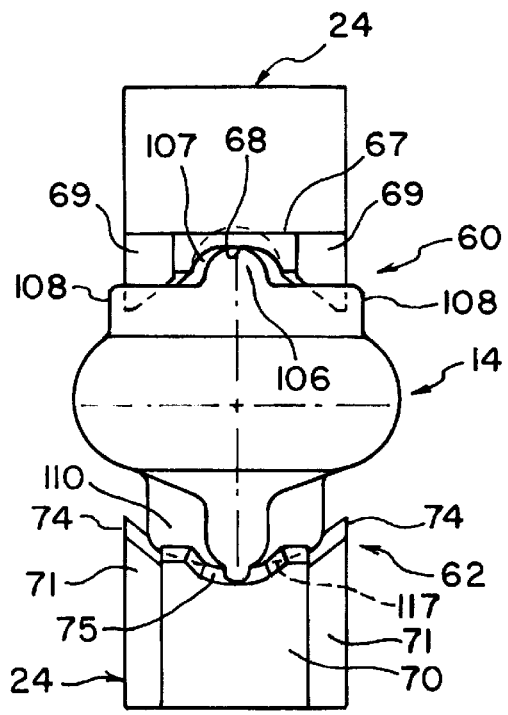
FIG. 25 is a schematic view of the cleat engaging the clamping members of the pedal illustrated in FIGS. 1–7.
Figure 26:
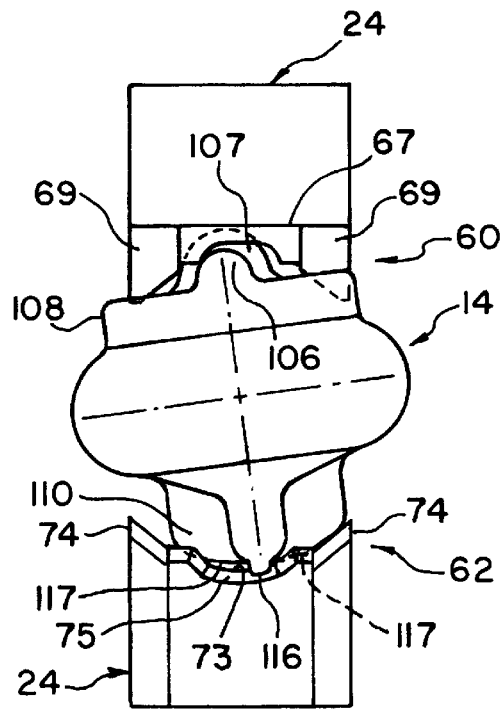
FIG. 26 is another schematic view, similar to FIGS. 23, of the cleat and clamping members of the pedal body but after a twisting force has been applied thereto.
Figure 27:
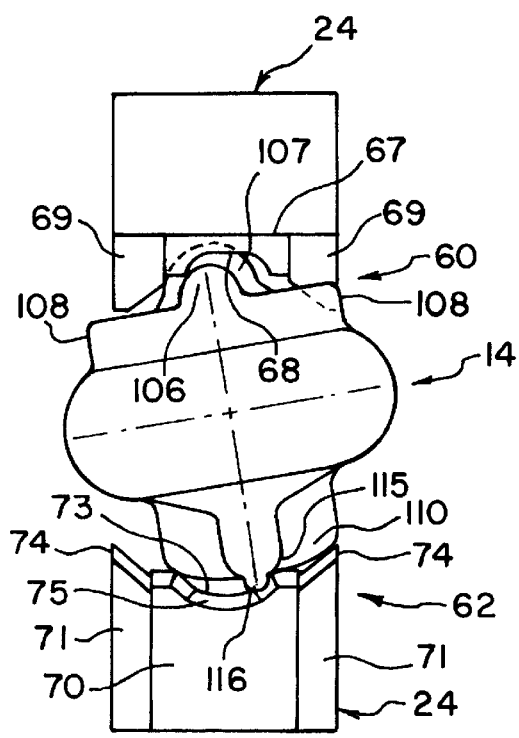
FIG. 27 is another schematic view, similar to FIGS. 23 and 24, of the cleat and clamping members of the pedal body but with the cleat twisted further from the cleat engagement position of FIG. 26.
Figure 28:
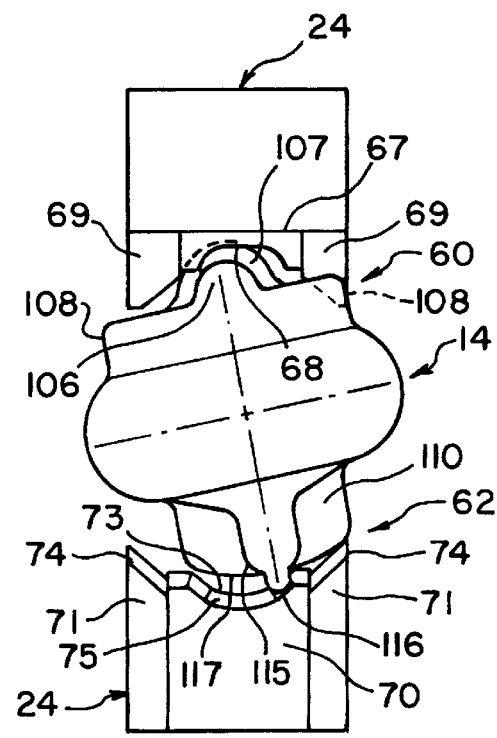
FIG. 28 is another schematic view, similar to FIGS. 23–25, of the cleat and clamping members of the pedal body with the cleat even further twisted from the cleat management position as shown in FIG. 27.

As best seen in FIGS. 8, 9 and 1, rear cleat engagement portion 62 has a center flange or portion 70 and a pair of side flanges or portions 71. Side flanges 71 lie in a plane that is beneath the plane of center flange 70. A downwardly facing cleat engagement surface 72 is formed on a center flange 70. Cleat engagement surface 72 forms a third cleat engagement surface that faces in substantially the same direction as first cleat engagement surface 64 of the front cleat engagement portion 60 of the other clamping member 24.

A curved stop surface 73 is also formed on center flange 71 of rear cleat engagement portion 62 for engaging cleat 14 to limit its longitudinal movement relative to pedal body 22, as explained below. Curved stop surface 73 extends substantially perpendicular to cleat engagement surface 72. Above curved stop surface 73 is a curved cleat engagement surface 75 that is angled relative to curved stop surface 73. Curved cleat engagement surface 75 engages a portion of cleat 14 to prevent cleat 14 from further downward movement. Accordingly, a gap is formed between tubular portion 36 of pedal body 22 and the bottom surface of cleat 14. Preferably, a minimum clearance of approximately 0.35 mm is created between the tubular member of pedal body 22 and the bottom surface of cleat 14.

Sides flanges 71 have cleat guide surfaces 74 that are angled to engage cleat 14. Cleat guide surfaces 74 form guide elements that aid in the release of cleat 14 from pedal 10. During twisting of cleat 14 relative to pedal 10, cleat 14 rides along one of the releasing surfaces 74 causing the clamping member 24 to be pivoted rearwardly against the force of biasing member 28. Pedal body 22 has a center plane C passing through the longitudinal axis A of rotation to divide pedal body 22 in half. Each of the cleat guide surfaces 74 is located closer to a center plane C of pedal body 22 than the cleat engagement surface 72.

Operation of the pedal 10 will now be briefly described with reference to FIGS. 1, 3, 4 and 23–26. When bicycle shoe 12 is to be attached to the pedal 10, the tip of shoe 12 is moved forward towards one of the front cleat engagement portions 60 so that the tip of cleat 14 is inserted into one of the cleat clamping members 24 (see FIGS. 23–26).

Once the tip of the cleat 14 has been inserted into one of the cleat clamping members 24 of the front cleat engagement portion 60, force is applied to the heel side of the shoe 12, such that shoe 12 is pushed down toward the pedal 10. When the heel is pressed down further from this state, the rear end of the cleat 14 rotates the rear cleat engagement portion 62 backward against the biasing force of the springs 28. Cleat 14 then slides between the two cleat engagement portions 60 and 62. Once the cleat 14 has slid between the two cleat engagement portions 60 and 62, the rear cleat engagement portion 62 is biased by the springs 28 back to its original position. Rotation of rear cleat engagement portions 62 is stopped by flanges 58 engaging side portions 38 of pedal body 22. As a result, cleat 14 is engaged between the two cleat engagement portions 60 and 62 of clamping members 24 (see FIGS. 4 and 5).

When the shoe 12 is to be removed from the pedal 10, the heel portion of the shoe 12 is lightly twisted to the outside. This twisting motion will cause the rear cleat engagement portion 62 to rotate against the energizing force of the springs 28. During this twisting of cleat 14 relative to pedal 10, cleat 14 rides along one of the guide surfaces 74 to cause the clamping member 24 to be pivoted rearwardly against the force of biasing member 28. After sufficient twist of cleat 14, the engagement of the rear end of cleat 14 will be released.

Referring to FIG. 7, each of the tension adjustment mechanisms 30 preferably includes an adjustment bolt 77 and an adjusting nut 78. Adjustment bolt 77 is rotatably received in hole 90 of clamping member 24. Moreover, adjusting nut 78 is threaded onto adjustment bolt 77, and has a pair of flanges for engaging one of the ends of springs of biasing member 28. Accordingly, rotation of adjustment bolt 77 causes adjusting nut 78 to move axially along the shaft of adjustment bolt 77. Preferably, clockwise rotation of adjustment bolt 77 causes the spring tension of biasing member or springs 28 on clamping member 24 to increase, while counterclockwise rotation of adjustment bolt 77 causes a decrease in the spring tension of biasing member or springs 28 on clamping member 24. A tab of adjusting nut 78 is located within a slot of clamping member 24. Preferably, adjusting nut 78 is visible through the slot in clamping member 24 such that it acts as a tension indicator for the user to determine the amount of tension being applied by biasing member 28 on clamping member 24. This allows the user to easily adjust a pair of bicycle pedals 10 such that they each have equal spring tension.

Referring now to FIGS. 16 through 22, bicycle shoe cleat 14 basically includes a middle attachment portion 100, a first coupling portion or member 102 extending from one end of attachment portion 100 and a second coupling portion or member 104 extending from the other end of attachment portion 100. In the illustrated embodiment, first coupling portion or member 102 is a front coupling member that engages front cleat engagement portion 60, while second coupling portion or member 104 is a rear coupling member that engages rear cleat engagement portion 62.

Attachment portion 100 has an upper sole side facing in a first direction for engaging sole 18 of shoe 12 and a lower pedal side facing in a second direction which is substantially opposite to said first direction. Preferably attachment portion 100 and coupling portions 102 and 104 are integrally formed together as a one-piece, unitary member, which is constructed from a suitable rigid material.

Attachment portion 100 has a hole or slot 103 for receiving one or more fasteners for fixedly coupling cleat 14 to sole 18 of the cyclist's shoe 12 in a relatively conventional manner. The interconnection of cleat 14 to sole 18 is relatively well known in the art, and thus, this interconnection will not be discussed or illustrated in detail herein.

First or front coupling portion 102 has a front nose portion 105 with a curved stop surface 106 and a first coupling surface 107. First or front coupling portion 102 also has side portions with second coupling surfaces 108. First coupling surface 107 faces towards sole 18 of shoe 12, while second coupling surfaces 108 face in substantially the opposite direction towards pedal body 22. First coupling surface 107 is located between the upper and lower pedal sides of attachment portion 100. Preferably, coupling surfaces 107 and 108 are formed so as to lie in substantially the same plane.

Front coupling portion 102 forms a first coupling member that extending from the front end of attachment portion 100. Front coupling portion 102 has its nose portion 105 designed to engage front cleat engagement portion 60 of clamping member 24. Curved stop surface 106 of nose portion 105 extends substantially perpendicular to the coupling surfaces 107 and 108. Front coupling surfaces 107 and 108 are preferably a substantially flat planar surface which is designed to engage front cleat engaging surfaces 64 and 66 of front cleat engagement portion 60 of clamping member 24, discussed above. Front coupling surface 107 is substantially flat or planar surface that curves about curved stop surface 106. Front coupling surfaces 108 form a split-coupling surface with two sections. Front coupling surface 107 is located between front coupling surfaces 108. Front coupling surface 107 is located further from attachment portion 100 than front coupling surfaces 108.

Curved stop surface 106 is designed to engage curved stop surface 68 of front clamping member 24 to prevent forward movement of cleat 14 relative to pedal body 22. Curved stop surfaces 68 and 106 together act as a pivot point for releasing cleat 14 from pedal body 22.

Second or rear coupling portion 104 extends from the second end of attachment portion 100 and has a rear nose portion 109 with a pair of third coupling surfaces 110 facing in substantially the same direction as the first coupling surface 106 of first coupling portion 102. Rear coupling surfaces 110 of rear coupling portion 104 engage rear cleat engaging surface 72 of rear cleat engagement portion 62 of clamping member 24 to secure cleat 14 to pedal body 20 via one of the clamping members 24. Rear coupling surfaces 110 are preferably substantially flat planar surfaces.

Rear attachment portion 104 also has a curved or angled ramp surface 114, which is designed to engage rear cleat engagement portion 62 of clamping member 24 during coupling of cleat 14 to pedal body 22. In particular, ramp surface 114 is designed to rotate clamping member 24 rearwardly from its normal cleat engaging position to its cleat releasing position during the downward movement of cleat 14 relative to pedal body 22.

Rear attachment portion 104 also includes a curved stop surface 115 for engaging curved stop surface 73 to prevent rearward movement of cleat 14 relative to pedal body 22 when coupled thereto. A protrusion 116 extends outwardly and upwardly from curved stop surface 115. Protrusion 116 engages curved cleat engagement surface 75 of center flange 70 above curved stop surface 73 as seen in FIG. 6 and 23–26. This engagement of protrusion 116 with curved cleat engagement surface 75 limits the downward movement of cleat 14 relative to pedal body 22. Accordingly, a gap is formed between tubular portion 36 of pedal body 22 and the bottom surface of cleat 14.

The side edges 117 of coupling surface 10 engage the angled guide surfaces 74 of side flanges 71 of clamping member 24. During twisting of cleat 14 relative to pedal 10, side edges 117 of cleat 14 rides along one of the angled guide surfaces 74 and protrusion 116 rides along cleat engagement surface 75 to cause the clamping member 24 to be pivoted rearwardly against the force of biasing member 28.

In coupling cleat 14 to bicycle pedal 10, the rider steps onto pedal body 22 which in turn causes clamping members 24 to automatically grip on to cleat 14 secured to the sole 18 of the cyclist's shoe 12. Tension adjusting mechanisms 30 can be adjusted to vary the force required for releasing the shoe cleat 14 from the step-in pedal 10.

More specifically, when attaching the cyclist's shoe to the step-in pedal 10 through cleat 14, the cyclist moves the shoe 12 obliquely downwardly and forwardly relative to pedal body 22 such that the front end or nose portion 105 of cleat 14 engages front cleat engagement portion 60 of one of clamping members 24 of pedal body 22. Once the front end of cleat 14 is engaged with front cleat engagement portion 60 of one of clamping members 24, the cyclist places the rear end of cleat 14 in contact with rear cleat engagement portion 62 of the other clamping member 24 of pedal body 22. This causes ramp surface 114 to engage the angled surface of rear cleat engagement portion 62. In this position, the cyclist presses the shoe 12 downwardly against pedal 10 to cause the rear one of the clamping member 24 to initially pivot rearwardly against the force of biasing member 28 to a cleat releasing position. The rear end of cleat 14 then enters a position opposite a back face of the rear engagement portion 62 of clamping member 24. Then, rear clamping member 24 returns under the force of a biasing member 28 so that rear engagement portion 62 of clamping member 24 engages the rear end of cleat 14. This engagement fixes the cyclist's shoe to pedal 10 via cleat 14.

In the cleat engaged position, the front and rear coupling portions 102 and of cleat 14 are held in place and prevented from vertical movement. Specifically, first cleat engagement surface 64 contacts first front coupling surface 106 and second cleat engagement surface 66 contacts second front coupling surface 108. Rear cleat engagement surface 72 of clamping member 24 contacts rear coupling surface 110 and protrusion 116 of cleat 14 to fixedly couple rear coupling portion 104 of cleat 14 to pedal body 22.

When releasing the shoe 12 from pedal 10, the cyclist will typically turn the shoe 12 about an axis perpendicular or approximately perpendicular to axis B of pedal 10. As a result of this pivoting action, the rear one of clamping members 24 is pivoted against the force of the springs 28 to a cleat releasing position to release the shoe 12 from pedal 10. During this pivoting or twisting movement of cleat 14, curved stop surface 115 of cleat 14 slides along curved stop surface 73 of center flange 70. This sliding the rear coupling member 104 of cleat 14 pushes rear clamping member 24. When the rear coupling member 104 of cleat 14 reaches the corner or end of the curved stop surface 73 of center flange 70, both coupling surfaces 110 of cleat 14 are completely released from rear claiming member 24. At this moment, cleat guide surfaces 74 of side flanges 71 are pushed up by side edges 117 of cleat 14. The cleat guide surfaces 74 of clamping member 24 engage the side edges 117 of cleat 14 at the very end of the twisting motion of the cleat 14 to aid in the release of the cleat 14 from pedal 10. Accordingly, the rider can easily step out of the pedal 10.

The functions of cleat guide surfaces 74 of clamping member 24 and side edges 117 of cleat 14 are to lift the cleat 14 and the clamping member upwardly so that the rider can easily step out.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle pedal assembly for attaching a shoe thereto via a cleat, comprising:
    a pedal shaft having a first end for attachment to a bicycle crank and a second end;
    a pedal body rotatably coupled to said second end of said pedal shaft, said pedal body having a first end and a second end with a longitudinal axis extending therebetween;
    a first clamping member pivotally coupled to said first end of said pedal body, said first clamping member having a center portion with a first cleat engagement surface facing in a first direction and a first cleat guide element located laterally of said center portion, said cleat guide element including a sloped surface relative to said center portion said clamping member, which guides the cleat out from said first clamping member upon a relative twisting movement occurring between the cleat and said pedal body; and
    a second clamping member coupled to said second end of said pedal body, said second clamping member having a second cleat engagement surface facing in said first direction.

2. A bicycle pedal assembly according to claim 1, wherein said second clamping member further includes a third cleat engagement surface facing in a second direction which is substantially opposite to said first direction.

3. A bicycle pedal assembly according to claim 1, wherein said first clamping member further includes a first laterally extending side portion with said first cleat guide element located thereon.

4. A bicycle pedal assembly according to claim 3, wherein at least a portion of said first cleat guide element is located closer to a center plane of said pedal body than said first cleat engagement surface.

5. A bicycle pedal assembly according to claim 3, wherein said first clamping member further includes a second laterally extending side portion with a second cleat guide element located thereon.

6. A bicycle pedal assembly according to claim 5, wherein at least a portion of each of said first and second cleat guide elements is located closer to a center plane of said pedal body than said first cleat engagement surface.

7. A bicycle pedal assembly according to claim 1, wherein said center portion of said first clamping member has a first curved stop surface extending substantially perpendicular to said first cleat engagement surface.

8. A bicycle pedal assembly according to claim 7, wherein said center portion of said first clamping member has a fourth cleat engagement surface located adjacent said first curved stop surface.

9. A bicycle pedal assembly according to claim 7, wherein said second clamping member further includes a third cleat engagement surface facing in a second direction, which is substantially opposite to said first direction, and a second curved stop surface extending substantially perpendicular to said second and third cleat engagement surfaces.

10. A bicycle pedal assembly according to claim 9, wherein
    said second and third cleat engagement surfaces lie in substantially a single plane.

11. A bicycle pedal assembly according to claim 10, wherein
    said third cleat engagement surface has two spaced apart sections with said second cleat engagement surface located between said spaced apart sections.

12. A bicycle pedal assembly according to claim 1, further comprising
    a first biasing member coupled between said pedal body and said first lamping member.

13. A bicycle pedal assembly according to claim 12, wherein
    said first biasing member includes at least one torsion spring position on a first pivot pin.

14. A bicycle pedal assembly according to claim 12, wherein
    said first clamping member includes a first tension adjustment mechanism engaging said first biasing member.

15. A bicycle pedal assembly according to claim 12, further comprising
    a first adjustment member movably coupled to said pedal body for movement between a first position spaced from said first clamping member and a second position engaged with said first clamping member to rotate said first clamping member and place said first biasing member under tension.

16. A bicycle pedal assembly according to claim 1, wherein
    said pedal body has a tubular portion for receiving said pedal shaft and a pair of side sections coupled to opposite ends of said tubular portion.

17. A bicycle pedal assembly according to claim 16, wherein
    said first clamping member is pivotally coupled to between first ends of said side sections.

18. A bicycle pedal assembly according to claim 12, wherein said second clamping member is pivotally coupled to said pedal body with a second biasing member being coupled between said pedal body and said second clamping member.

19. A bicycle pedal assembly according to claim 18, further comprising a first adjustment member movably coupled to said pedal body for movement between a first position spaced from said first clamping member and a second position engaged with said first clamping member to rotate said first clamping member and place said first biasing member under tension; and a second adjustment member movably coupled to said pedal body for movement between a first position spaced from said second clamping member and a second position engaged with said second clamping member to rotate said second clamping member and place said second biasing member under tension.

20. A bicycle pedal assembly according to claim 1, wherein said first and second clamping members are substantially identical.

* * * * *